UNITED STATES PATENT OFFICE.

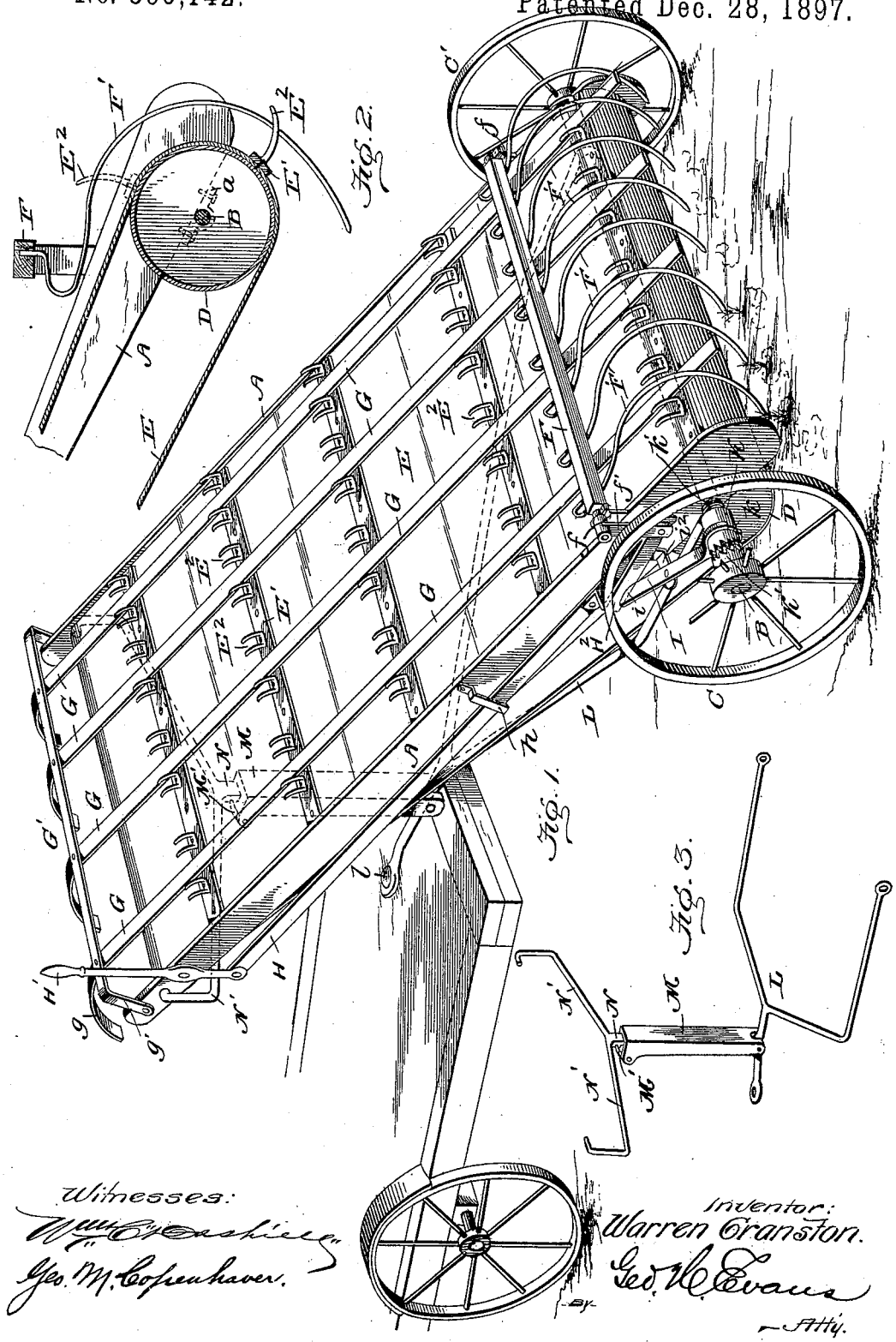

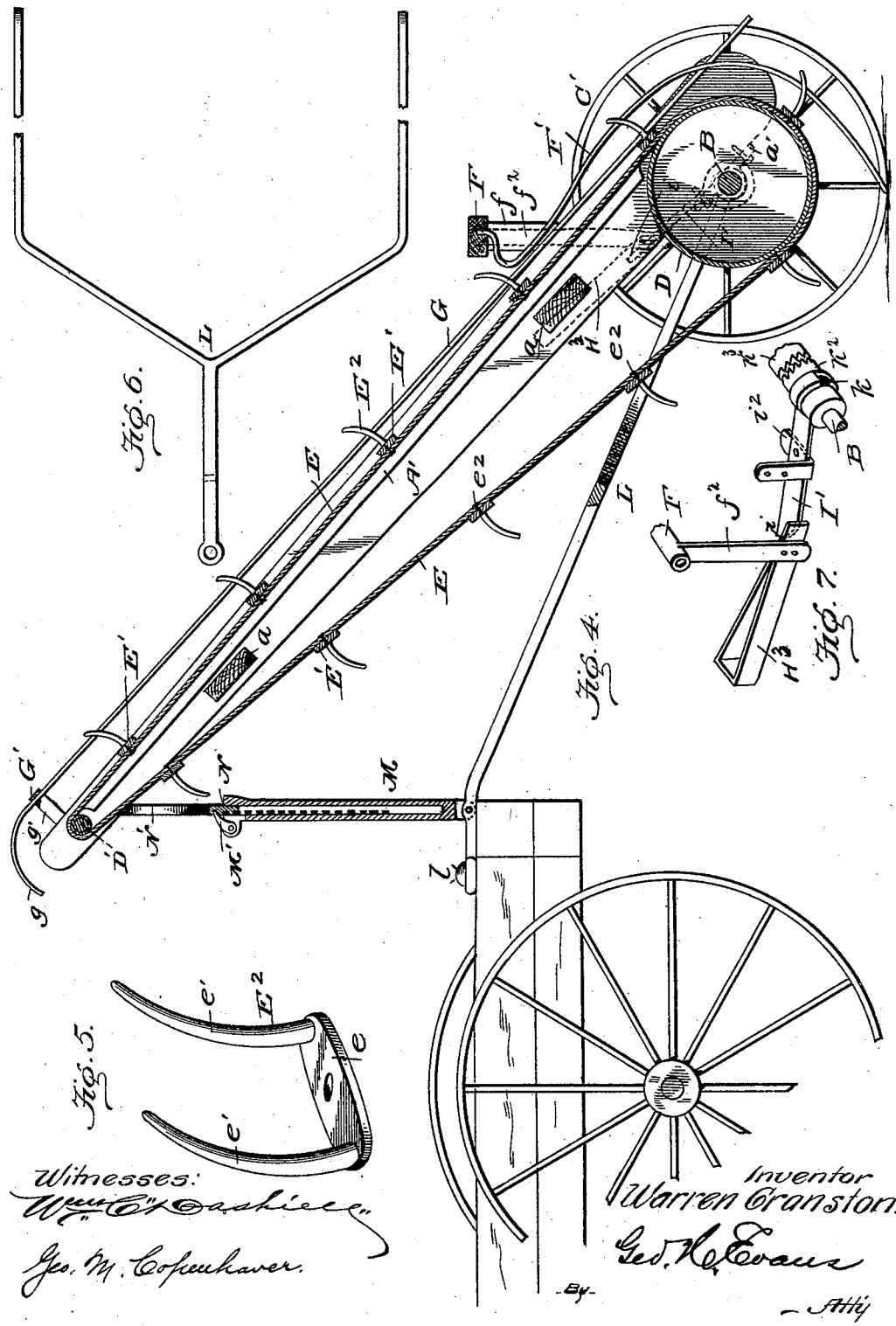

WARREN CRANSTON, OF WATERLOO, IOWA.

HAY RAKE AND LOADER.

SPECIFICATION forming part of Letters Patent No. 596,142, dated December 28, 1897.

Application filed December 28, 1896. Serial No. 617,229. (No model.)

*To all whom it may concern:*

Be it known that I, WARREN CRANSTON, a citizen of the United States, residing at Waterloo, Black Hawk county, Iowa, have invented certain new and useful Improvements in a Combined Hay Rake and Loader, of which the following specification contains a full, clear, and exact description, reference being had to the accompanying drawings, forming a part thereof, in which—

Figure 1 is a perspective view of my improved hay rake and loader, the teeth being elevated and the shaft or axle unclutched from the ground-wheel. Fig. 2 is a detail sectional view of the lower drum, the elevator-apron, and the rake in its operative position. Fig. 3 is a perspective, on a smaller scale, of the draft and adjusting device. Fig. 4 is a central vertical longitudinal section through the machine. Fig. 5 is a perspective of one of the elevator or apron teeth. Fig. 6 is a plan of the draft-yoke, and Fig. 7 is a detail view of the right-hand clutch mechanism.

My invention has relation to that class of hay rakes and loaders in which the hay is taken from the rake-teeth by means of an endless toothed elevator and conveyed thereby to the top of the loader and discharged thereover into the hay-rack or wagon.

The objects of the invention are to provide a hay rake and loader in which the movement of the hay will be continuous, even, and without any jerky motion from the time it is first engaged by the elevator-teeth until it is discharged therefrom; also, to provide a hay rake and loader free from belts, pulleys, gear-wheels, sprocket-chains, and other like expensive gearing, so that the machine will be exceedingly simple and inexpensive, not liable to get out of order, and which may be readily repaired in the latter event; also, to construct the rake-teeth, the lower drum, and the elevator in such relation that the rake-teeth will be relieved from considerable back pressure and strain by the curved forked elevator-teeth straddling them and pulling the hay forwardly and upwardly away from them; also, to provide an improved means for adjusting the upper forward end of the loader up and down, and also to provide a simple and effective mechanism for rocking the rake-head and operating the clutch.

The invention will first be described, and then specifically pointed out in the claims.

A A represent the inclined side bars of the frame, connected by upper and lower cross-pieces $a$, having boxes $a'$ at the lower edges of their lower ends to receive the shaft or axle B, which rotates therein and on the ends of which the ground-wheels C C' are loosely mounted.

The lower larger drum D is secured fast upon the axle or shaft B, and the upper smaller drum D' is mounted at the upper ends of the side bars A A. E is the endless canvas apron or belt passing around the drums D D' and operated by the rotation of the former through frictional contact therewith. This endless apron or belt E is provided with cross-slats E' on its upper side, which serve to stiffen it and form means for supporting the teeth $E^2$. These teeth each comprise an apertured base $e$ and a pair of forwardly-curved prongs $e'$, bolts $e^2$ being employed to secure the teeth to the slats E'. The side edges of the upper run of the apron or belt E are supported by the strips A', secured on the inner sides of the inclined side bars A A.

F is the rake-head, mounted to rock in the bearings $f\,f$, secured on the upper edges of the side bars A A over the drum D and somewhat in advance of the axle or shaft B, and F' are the spring rake-teeth, secured at their upper ends in any preferred manner to the rake-head and curved forwardly and downwardly and thence rearwardly and around the lower drum D concentrically for about ninety degrees, and thence projected downwardly and forwardly under the drum with their points extending to the ground-line. The elevator-teeth $E^2$ straddle the rake-teeth in passing around the lower drum, and owing to their curvature will seize the hay as it is gathered and carry it steadily upwardly and forwardly out of engagement with the rake-teeth. As the elevator-teeth curve forwardly it will be seen that they relieve the rake-teeth from back strain and pressure as soon as they engage the hay and carry the hay uninterruptedly to the delivery end of the elevator-apron.

The hay is held down on the apron by the flexible metallic strips or guards G, which extend from the cross-bar G' at the upper end of the frame, over the elevator, under the rake-head, and between the rear curved ends of the rake-teeth. The lower ends of these strips or guards G assist in holding the hay down to the lower end of the elevator-apron or rather to those teeth on that portion of the elevator, so that the movement of the hay will be certain, positive, and continuous, and as the rake-head is well over the upper end of the belt there is no chance for the elevator-teeth to become disengaged from the hay, which will proceed on its upward course and be deflected downwardly at the delivery end of the loader by the curved upper end $g$ of the strips G.

In the machine in actual use the ground-wheels C C' are thirty-six inches in diameter and the drum D is twenty-four inches in diameter, so that while the ground-wheels are passing over a certain space the elevator has only traveled over two-thirds of that space, but has all the hay to carry that the ground-wheels pass over. Thus the drum is large enough to drive the elevator without gearing and large enough to conform to the size of the rake-teeth, which, as before stated, are of the same curvature for ninety degrees or more. The hay gets well on the elevator before the pressure of the rake-teeth thereon ceases.

The cross-bar G' is secured to the side bars A A by bending the ends down, as at $g$ $g'$, and securing the same by bolts or otherwise.

In order that the rake-teeth may be raised and the elevator stopped when the machine is being driven to and from the field, I provide the rake-head at its ends with depending crank-arms $f'$ $f^2$, and the lower ends of the arm $f'$ is pivotally connected with the rear end of a sliding rod H, working through the guide $h$ on one of the side bars A and pivotally connected at its upper forward end to the lower end of hand-lever H', which is pivoted near the upper end of the same side bar. The lower rear end of the operating-rod H is provided on its outer face with an incline or cam $H^2$, the widest portion of which is toward the upper end of the rod, and this incline or cam engages the inclined end $i$ of a pivoted clutch-operating lever I, mounted on a bracket $i^2$, with its forked end engaging a groove $k$ in the clutch-section K, mounted to slide, but not turn, on the axle or shaft B. A similar clutch-section $K^2$ is placed on the opposite end of the axle I' and is engaged by an operating-lever I', which in turn is engaged by a cam $H^3$ just like the cam $H^2$, but carried by the crank-arm $f^2$. The clutch-sections K $K^2$ are pressed outwardly by springs $k'$ into engagement with clutch-sections $K'$ $K^3$, secured, respectively, to the hubs of the ground-wheels C C'. It follows, therefore, that a forward pull on the hand-lever H' will move the rod H downwardly, rock the rake-head, and raise the rake-teeth, and simultaneously the cams $H^2$ $H^3$ will move the upper ends of the shipping-levers I I' outwardly and cause the lower forked ends to move the clutch-sections K $K^2$ inwardly, while a reverse movement will throw the parts into their operative positions.

The hand-lever H' may be locked in its adjusted position by any of the well-known devices for such purposes.

L is the draft-yoke or forked bar, mounted at its rear ends on the shaft or axle B and having a bolt-aperture in its forwardly-projecting front extension, by means of which it may be coupled to the rear end of the hay-rack by a bolt $l$, as shown in Fig. 1.

M is a vertical hollow standard pivotally supported at its lower end by the front end or extension of the draft-yoke and provided at its upper end with a pawl M', and N is the vertical supporting and adjusting rack-bar sliding in the standard M and held at any desired adjustment by means of the pawl M'. The upper end of the rack-bar is provided with a fork N', the ends of which are pivotally connected to the upper ends of the side bars A A. Thus the elevator may be raised at its upper end from time to time as the load in the wagon or rack increases.

It will be seen that the machine is simple in its construction and that there are no belts, chains, sprockets, or gear-wheels for the hay to become tangled with and interfere with the operation.

What I claim is—

1. A combined hay rake and loader comprising, the inclined frame, a shaft or axle B journaled on the lower end of the frame and provided with ground-wheels, a large drum secured on and turning with said ground-wheel shaft or axle, a smaller drum journaled on the upper end of the frame, an apron extending around said two drums and of the same width as the frame and the length of the drum to prevent the hay from getting thereunder, a rake-head journaled above the lower drum and in advance of a vertical line through the axis thereof, rake-teeth F' secured to said head, curved directly forward therefrom, then downwardly toward the apron, then extending directly rearward along the apron, then curved concentrically around the rear of the large drum and thence projecting downwardly to the ground-line, and transverse series of pairs of upwardly and forwardly curved teeth $E^2$ secured to the apron and of a length to straddle the rake-teeth F', from near their points to their head F to thereby exert an upward and forward pull on the hay and relieve the rake-teeth from rearward strain, substantially as set forth.

2. The combination with the frame and endless toothed elevator, the lower drum of which is fast on the ground-wheel axle or shaft, sliding clutch-sections turning with said shaft and engaging clutch-sections on the adjacent ground-wheels, and the rake-head provided with rake-teeth and having depending arms at its end, the clutch-operating levers pivoted between their ends to the frame and engaging the sliding clutch-sections with their lower ends to move the said sections inwardly out of engagement with the other clutch-sections, a sliding rod at one side of the frame, having an operating hand-lever at the upper end of the frame and pivoted at its lower rear end to one rake-head arm, a wedge-like cam or incline on the outer side of the lower end of the sliding rod to engage the inner side of the upper end of one of said clutch-operating levers, and a cam on the other depending arm and engaging the other clutch-operating lever, substantially as described.

WARREN CRANSTON.

Witnesses:
C. E. DAILEY,
C. H. HACKETT.